United States Patent Office 2,766,226
Patented Oct. 9, 1956

2,766,226

BIS-SULFONYLTRIAZENES

William Baptist Hardy and Frederic Henry Adams, Bound Brook, N. J., assignors to American Cyanamid Company, New York, N. Y., a corporation of Maine No Drawing. Application December 14, 1954, Serial No. 475,298

6 Claims. (Cl. 260—140)

This invention relates to a new class of compounds. Particularly, it relates to triazenes, especially bis-sulfonyltriazenes of the formula:

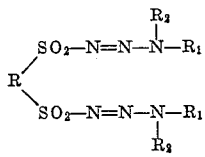

in which R is a mono- or diarylene radical which may be substituted and in which the nuclei of the diarylene radical may be interposed by an oxygen or sulfur atom; $R_1$ is an aryl or heterocyclic radical which may be substituted; and $R_2$ is an aliphatic radical linked through a saturated carbon to the nitrogen such as alkyl, alkenyl, aralkyl and the like which may be substituted.

The new compounds in accordance with this invention are useful in the fields of pharmaceuticals, dyes, rubber processing, and the like. Specifically, it has been found that these compounds are particularly useful as blowing agents in the preparation of cellular rubber and plastic materials.

In preparation of the new sulfonyltriazenes, a bis-sulfonamide can be reacted with a stoichiometrically equivalent amount of an aromatic or heterocyclic diazo compound to form the intermediate diazo bis-sulfonamide. The intermediate is then further substituted, as, for example, by using a lower dialkyl sulfate such as dimethyl or diethyl sulfate. The N-substitution may also be accomplished other than by direct alkylation. When, for instance, the substituent is to be a cyanoalkyl, the diazo bis-sulfonamide may be reacted with an acrylonitrile. This latter procedure forms the subject matter of applicants' copending application for U. S. Letters Patent, Serial No. 475,283, filed of even date.

The bis-sulfonamides employed in preparation of the intermediate diazoamido compounds are mono- and di-arylene sulfonamides in which the nuclei of the diarylene radical may be interposed by an oxygen or sulfur. As examples, there might be mentioned benzene bis-sulfonamides, o-, m- and p-xylene disulfonamides, naphthalene 1,5-bis-sulfonamide, anthracene-1,5-bis-sulfonamide, acenaphthene-5,6-disulfonamide, 4,4'biphenylene-bis-sulfonamides, 1,1'-oxy-4,4'-bis(benzenesulfonamide), and the like.

The diazo compound with which the bis-sulfonamide is coupled is an aromatic or heterocyclic diazonium salt. Aromatic diazonium salts of the benzene and naphthalene series are preferred. For example, there may be used benzene diazonium chloride as well as diazonium salts of o-, m- and p-substitution products of benzene diazonium chloride such as o-, m- and p-methoxy, o-, m- and p-methyl, o-, m- and p-chlorobenzene diazonium chlorides and the like. Di- and poly-substituted benzene diazonium salts such as o-, m- and p-xylene diazonium salts, 4-benzoylamino-2,5-diethoxybenzene diazonium salts, and the like may be used. Examples of heterocyclic diazo compounds which may be employed are 1-quinoline-5- and-6-diazonium chlorides, 9-ethylcarbazole-3-diazonium chloride, benzoxale-5-diazonium chloride, benzothiazole-5-diazonium sulfate and the like.

The intermediate diazoamino compounds so obtained are then treated to obtain the N-substituted sulfonyltriazenes of this invention. The $R_2$ residue so obtained is an aliphatic radical linked through a saturated carbon atom to the nitrogen. As examples, there might be mentioned lower alkyl radicals such as methyl, ethyl, propyl, butyl and the like and chloro-derivatives thereof; alkenyl radicals such as allyl; cyanoalkyl radicals such as β-cyanoethyl, β-cyanopropyl, β-cyano-α-methyl-ethyl, β-cyano-α-isopropyl-ethyl, β-cyano-α-isobutyl-ethyl and the like; aralkyl radicals such as benzyl and phenylethyl; and the like.

The invention is further illustrated by the following examples which are not intended to be limiting. All parts are by weight unless otherwise noted.

EXAMPLE 1

1,1' - (1,5 - naphthalenedisulfonyl) - bis - [3 - methyl-3-phenyltriazene]

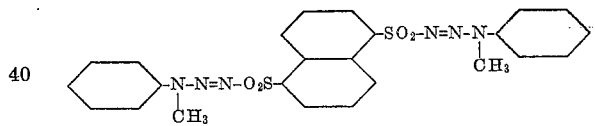

To a mixture of 100 parts water and 71.4 parts of 37.5% hydrochloric acid is added 18.6 parts of aniline, the resultant mixture is iced, and a further addition of 40 parts by volume of 5 N sodium nitrite made to give a solution of aniline diazo. The cold diazo solution is added to a 0–3° C. solution of 28.6 parts naphthalene-1,5-bis-sulfonamide in 1,500 parts of water mixed with 80.6 parts of 50% sodium hydroxide solution. To the resulting reaction mixture is added 58.1 parts of dimethyl sulfate. When methylation is complete, the product is isolated by filtration, washed and dried.

EXAMPLE 2

1,1' - (1,5 - naphthalenedisulfonyl) - bis [3 - methyl-3-(p-tolyl)triazene]

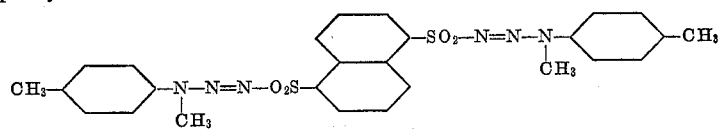

To a mixture of 100 parts of water and 71.4 parts of 37.5% hydrochloric acid is added 21.4 parts of p-toluidine. Upon icing and addition of 40 parts by volume of 5 N sodium nitrite solution a solution of p-toluidine diazo is formed. The cold diazo solution is added to a cold solution of 28.6 parts naphthalene-1,5-bis-sulfonamide in 1,500 parts of water mixed with 80.6 parts of 50% sodium hydroxide solution iced to below 5° C. To the resulting reaction mixture is added 58.1 parts of dimethyl sulfate. When methylation is complete, the product is isolated, washed and dried.

EXAMPLE 3

1,1 - toluene - 2,4 - disulfonyl - bis - (3 - methyl - 3-phenyl-1-triazene)

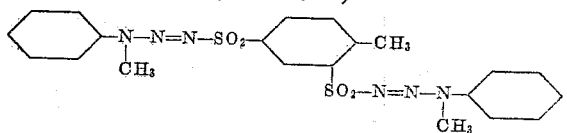

To a cold solution of 18.6 parts of aniline in 70 parts of 37.5% hydrochloric acid and 100 parts of water is added slowly 40 parts by volume of 5 N sodium nitrite solution. The diazo solution thus prepared is added gradually with stirring to an ice cold solution of 25 parts of toluene-2,4-disulfonamide in 1,500 parts of water and 81 parts of 50% aqueous sodium hydroxide. After stirring thoroughly there is then added gradually 58 parts of dimethyl sulfate and stirring continued at room temperature until reaction is complete. The product is then filtered, washed and dried.

EXAMPLE 4

1,1'-[ethylenebisoxy(p-phenylenesulfonyl)]-bis-[3-methyl-3-phenyltriazene]

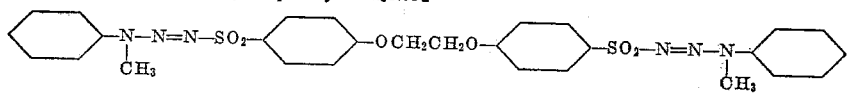

The procedure of Example 3 is repeated except that 37.2 parts of α,β-diphenoxyethane-4,4'-disulfonamide is used in place of 25 parts of toluene-2,4-disulfonamide.

EXAMPLE 5

1,1'-[oxybis(p-phenylenesulfonyl)]bis[3-methyl-3-phenyltriazene]

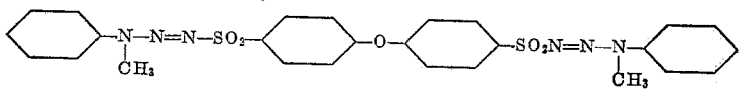

The procedure of Example 3 is repeated except that 32.8 parts of 1,1'-oxy-4,4'-bis(benzenesulfonamide) is used in place of 25 parts of toluene-2,4-disulfonamide.

To illustrate the use of the new compounds of this invention as blowing agents in the formation of cellular products, the following example was conducted.

EXAMPLE 6

A rubber stock containing the compound of Example 1 was prepared according to the following composition:

| Compound: | Parts |
|---|---|
| Plasticized rubber | 100 |
| Stearic acid | 2 |
| Zinc oxide | 5 |
| Keystone whiting | 50 |
| Unitane O-220 | 15 |
| Light process aid | 10 |

| Compound: | Parts |
|---|---|
| Petrolatum | 3 |
| 2,2' - methylene-bis - (4-methyl-6-t-butylphenol) | 0.5 |
| Sulfur | 3 |
| Bis-benzothiazole disulfide | 0.6 |
| Di-o-tolyl guanidine | 0.15 |
| 1,1' - (1,5 - naphthalenedisulfonyl) - bis-[3-methyl-3-phenyltriazene] | 1.5 |

Samples of the stock were blown at 153° C. for 35 minutes and 130° C. for 60 minutes. The mold size was 6 cubic inches and both high and low loads were blown. In the case of white stock the respective portions for high and low loads were 51 grams and 42 grams. For neutral colored stock they are 48.5 grams and 40 grams. In each instance, a completely blown, substantially colorless product of uniform, fine cell structure was obtained.

We claim:

1. A bis-sulfonyltriazene of the formula

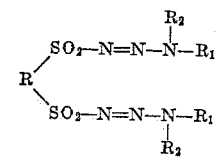

in which R is selected from the group consisting of monoarylene, diarylene and oxybisarylene; R₁ is an aryl radical of the benzene and naphthalene series; and R₂ is a lower aliphatic radical of 1-4 carbon atoms linked through a saturated carbon to the nitrogen.

2. 1,1' - (1,5-naphthalenedisulfonyl)-bis-[3-methyl-3-phenyltriazene] of the formula

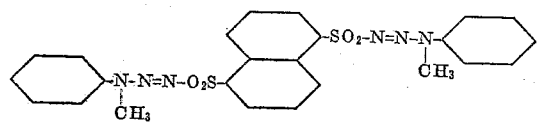

3. 1,1'-(1,5-naphthalenedisulfonyl) - bis - [3-methyl-3-(p-tolyl) triazene] of the formula

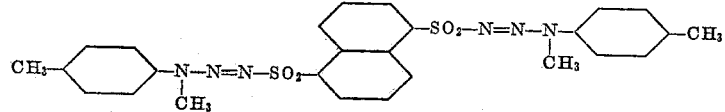

4. 1,1'-(toluene-2,4,disulfonyl) - bis - (3 - methyl - 3-phenyl-1-triazene) of the formula

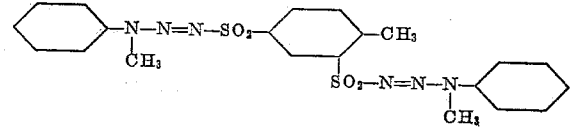

5. 1,1' - ($\alpha,\beta$ - diphenoxyethane-4,4'-disulfonyl)-bis-(3-methyl-3-phenyl-1-triazene) of the formula
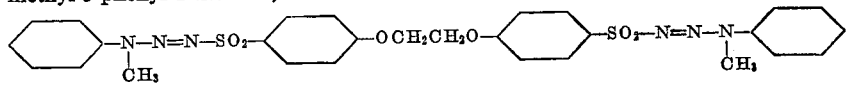
6. 1,1' - [oxybis(p - phenylenesulfonyl]-bis-[3-methyl-3-phenyltriazene] of the formula
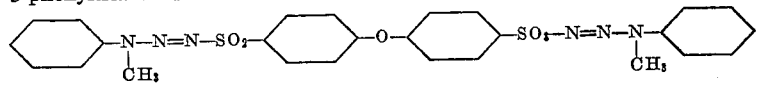
References Cited in the file of this patent
UNITED STATES PATENTS
| | | |
|---|---|---|
| 2,117,251 | Kleiderer et al. | May 10, 1938 |
| 2,402,611 | Dickey et al. | June 25, 1946 |